US005828920A

United States Patent [19]
Stephany et al.

[11] Patent Number: 5,828,920
[45] Date of Patent: Oct. 27, 1998

[54] TRANSLATIONAL ELECTROMAGNETIC CAMERA SHUTTER FOR VARIABLE APERTURE APPLICATIONS

[75] Inventors: Thomas Michael Stephany, Churchville; Edward Paul Furlani, Lancaster, both of N.Y.

[73] Assignee: Eastman Kodak Company, Rochester, N.Y.

[21] Appl. No.: 635,160

[22] Filed: Apr. 23, 1996

[51] Int. Cl.[6] .................................................. G03B 9/08
[52] U.S. Cl. .................... 396/463; 396/469; 396/470; 396/484; 396/487; 396/490
[58] Field of Search .................... 396/459, 463, 396/467, 468, 469, 470, 483, 484, 487, 489, 490, 508

[56] References Cited

U.S. PATENT DOCUMENTS

| | | | |
|---|---|---|---|
| 2,625,857 | 10/1953 | Simjian | 396/460 |
| 2,702,500 | 2/1955 | De Bell | 396/463 |
| 3,282,187 | 11/1966 | Cassidy et al. | 95/53 |
| 3,628,434 | 12/1971 | Leitz et al. | 396/490 |
| 3,987,473 | 10/1976 | Kondo | 354/234 |
| 4,024,552 | 5/1977 | Kondo | 354/234 |
| 4,051,499 | 9/1977 | Kondo | 254/234 |
| 4,054,892 | 10/1977 | Nakagawa et al. | 354/252 |
| 4,206,992 | 6/1980 | Theurer et al. | 354/235 |
| 4,208,110 | 6/1980 | Ito et al. | 354/31 |
| 4,265,530 | 5/1981 | Petersen | 354/235 |
| 4,269,493 | 5/1981 | Suzuki et al. | 354/51 |
| 4,319,211 | 3/1982 | Ueda et al. | 335/229 |
| 4,326,786 | 4/1982 | Uchiyama et al. | 396/468 |
| 4,333,722 | 6/1982 | Lee | 354/234 |
| 4,344,687 | 8/1982 | Cloutier | 354/246 |
| 4,384,778 | 5/1983 | Lee et al. | 354/230 |
| 4,408,857 | 10/1983 | Frank | 354/234 |
| 4,504,132 | 3/1985 | Martin et al. | 354/195.1 |
| 4,505,563 | 3/1985 | Wong et al. | 354/234.1 |
| 4,514,065 | 4/1985 | Carrera | 354/235.1 |
| 4,671,638 | 6/1987 | Capobianco et al. | 354/234.1 |
| 4,696,560 | 9/1987 | Ogihara et al. | 354/439 |
| 4,724,452 | 2/1988 | Mody et al. | 354/234.1 |

*Primary Examiner*—Eddie C. Lee
*Attorney, Agent, or Firm*—Edward Dugas

[57] ABSTRACT

A shutter is disclosed having a shutter blade frame comprised of two spaced apart rails, each rail incorporating at least one magnet section. Individual pairs of electromagnets are positioned for movement along the rails. At least one shutter blade, having an opening defined thereby, is connected to a pair of electromagnets for movement along the rails from a rest position to an open position. Application of current to the electromagnets causes the at least one shutter blade to travel along the rails causing an alignment of the defined opening with a selected light path to cause an exposure generally of an image sensor such as film. Springs are positioned on the shutter frame for urging the at least one shutter blade to the rest position.

5 Claims, 4 Drawing Sheets

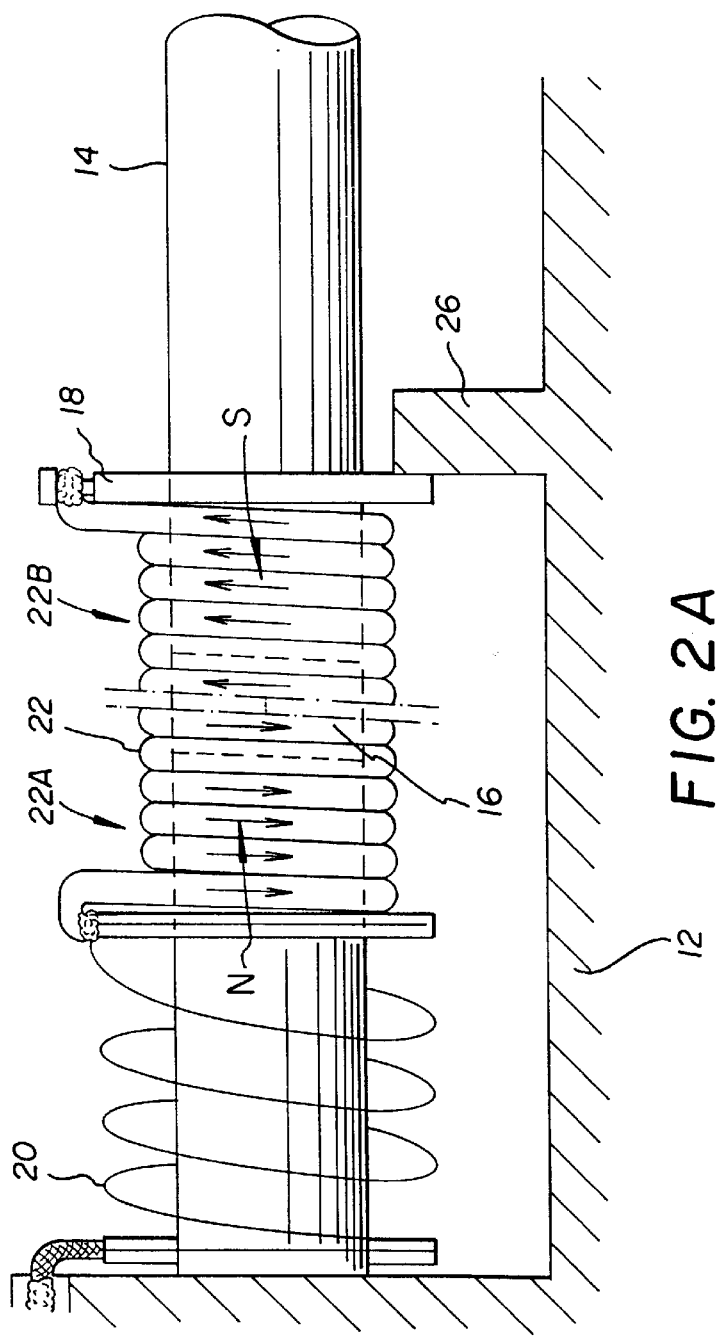
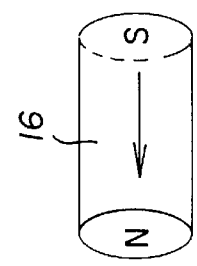

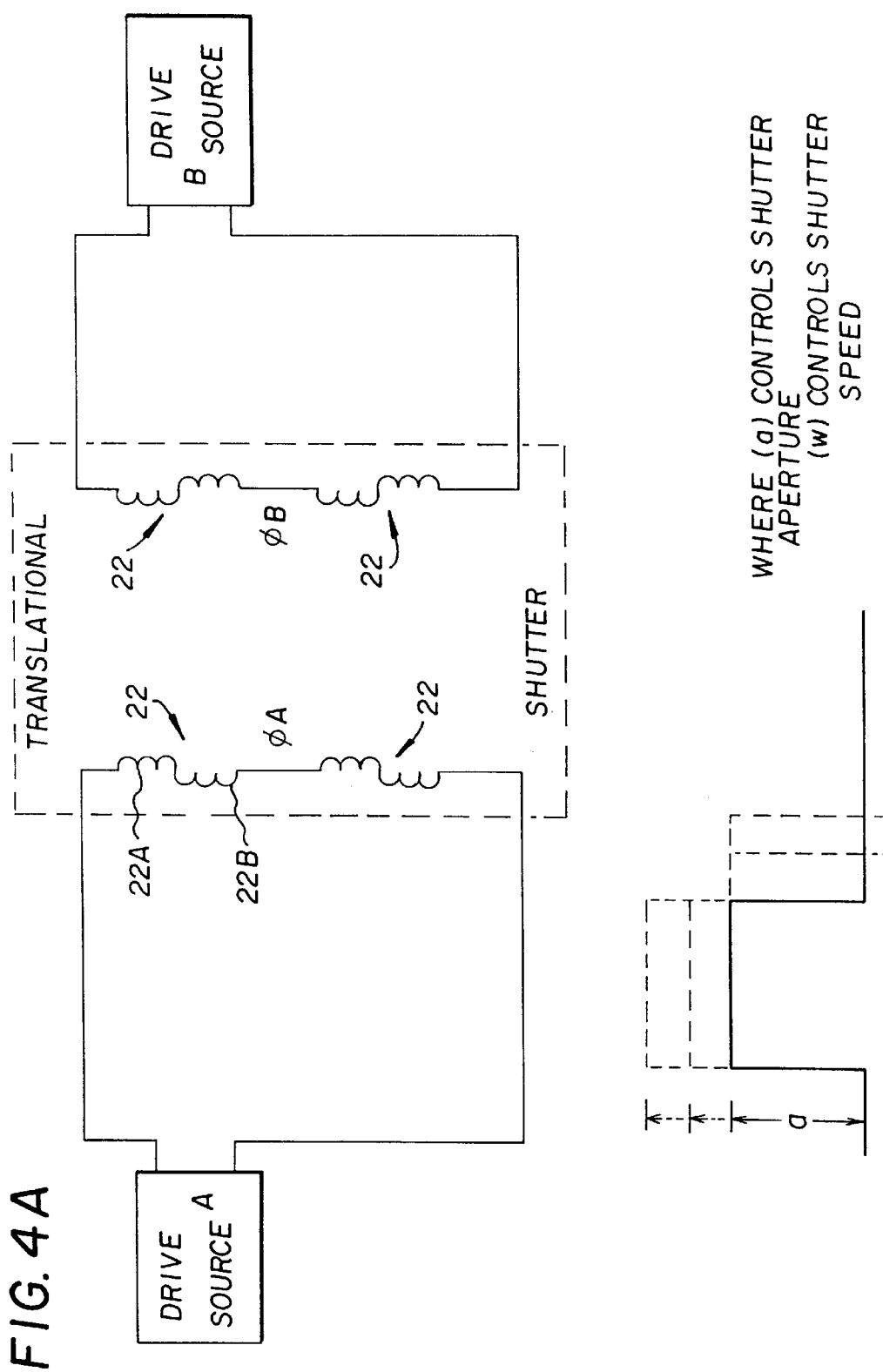

TRANSLATIONAL ELECTROMAGNETIC CAMERA SHUTTER FOR VARIABLE APERTURE APPLICATIONS

CROSS-REFERENCE TO RELATED APPLICATIONS

The present Application is related to U.S. patent application Ser. No. 60/001,137, filed Jul. 13, 1995, by Edward P. Furlani, et al., and entitled "Electromagnetic Camera Shutter," and Eastman Kodak Company Docket 73,757/E-D, filed Apr. 3, 1996, by Edward P. Furlani, et al., and entitled "Electromagnetic Camera Shutter With A Conductive Strip On The Blade And A Permanent Magnet Aperture."

FIELD OF THE INVENTION

This invention relates to the field of camera shutters and more particularly to an electromagnetic shutter.

BACKGROUND OF THE INVENTION

Electromagnetic actuators are routinely used for high speed camera shutters. These actuators typically consist of permanent-magnets, coils, and soft-magnetic materials that guide and focus the magnetic flux. The shutter blades are attached to a moving member which, in part, consists of a magnet or coil. The shutter is activated (opened or closed) when the moving member is subjected to a "drive" field which is provided by an additional field source (coil or magnet). Current is provided to the field source through wires that perform no secondary function. Inexpensive cameras require a shutter that is reliable, but also minimally expensive to fabricate. Towards that end, if a part can be made to perform more than one function a reduction in cost will follow.

SUMMARY OF THE INVENTION

The present invention is directed to overcoming one or more of the problems set forth above. Briefly summarized the invention is a shutter comprising:

a shutter blade frame comprised of two spaced apart rails, each rail incorporating at least one magnet section;

individual pairs of electromagnet means positioned for movement along said rails;

at least one shutter blade having an opening defined thereby and connected to a pair of electromagnet means for movement along said rails from a rest position to an open position so as to cause an alignment of the defined opening with a selected light path when current is applied to said electromagnet means; and spring means positioned on said frame for urging the at least one shutter blade to a rest position.

These and other aspects, objects, features, and advantages of the present invention will be more clearly understood and appreciated from a review of the following detailed description of the preferred embodiments and appended claims, and by reference to the accompanying drawings.

Advantageous Effect of the Invention

The present invention has the following advantages:

This shutter can be used for variable aperture applications in an open loop configuration without the need for feedback. This is because the electromagnetic drive force is constant throughout the range of travel and the restoring force is due to spring compression which is proportional to the length of compression. Both of these effects are predictable to a high degree of accuracy.

The magnets serve both as an energy source and as part of the translation support.

The springs serve both as conductors as well as mechanical return mechanisms.

BRIEF DESCRIPTION OF THE DRAWINGS

FIG. 2A is an enlarged view of a portion of the shutter illustrated in FIG. 1;

FIG. 2B illustrates in a sectioned view a magnet that forms a portion of a cylindrical bearing rod used in the shutter and shown in FIG. 1;

FIGS. 4A and 4B illustrate a schematic and a current waveform for driving the shutter blades of the shutter embodiment illustrated in FIG. 1.

To facilitate an understanding of the invention, identical reference numerals have been used, where possible, to designate identical elements that are common to the figures.

DETAILED DESCRIPTION OF THE INVENTION

Figure 1:
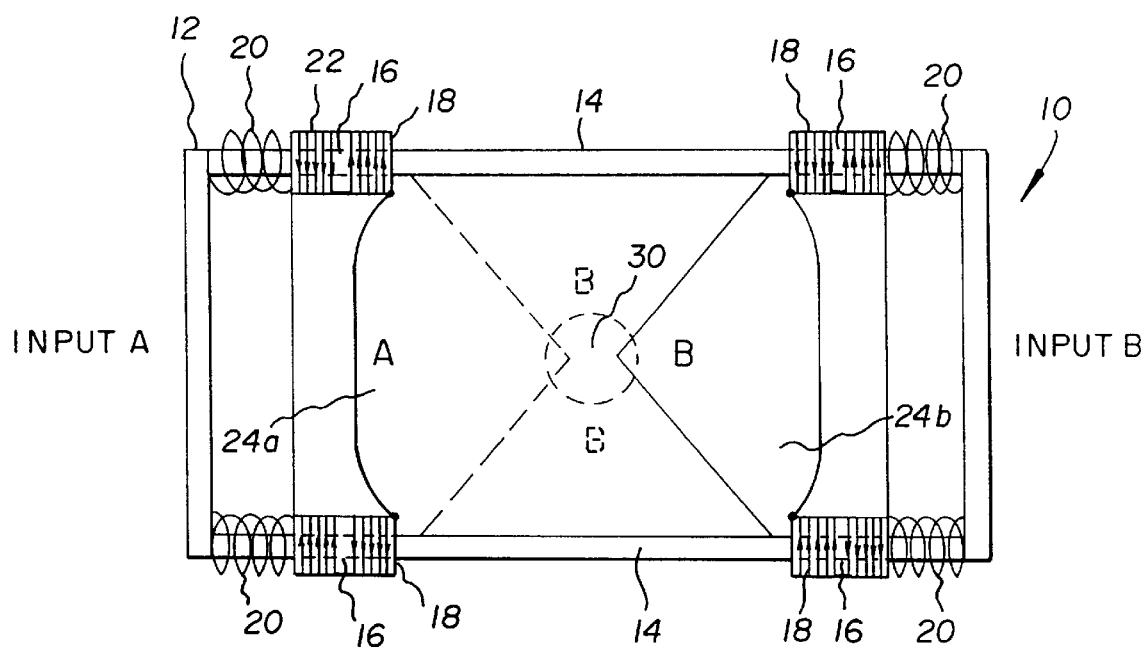
FIG. 1 illustrates the shutter of the present invention in its closed state.

Referring to FIG. 1, the camera shutter 10 is comprised of a frame 12 that supports two spaced-apart parallel bearing rods 14 incorporating sections 16 of axially polarized magnets. Two low friction, coil wound bobbins 18 are mounted for translation on each rod 14. The bobbins may be formed of a low friction material such as Delrin. Two conductive springs 20 are mounted on each rod 14 with one end of each spring 20 physically connected to a bobbin 18 and electrically connected in series with an electrical coil 22 (shown more clearly in FIG. 2A) that is wound on a respective bobbin 18. The other end of each spring 20 is physically attached to the frame 12. Two shutter blades 24A and 24B are slidably mounted in a transverse relation to the rods 14 and physically attached to the inner sides of the bobbins 18. Note that the coil 22 on each bobbin 18 is wound in one direction for half their length and in the opposite direction for the other half of their length (shown more clearly in FIG. 2A). The reason for this is that when current passes through the coil, the current in the first half of the coil will interact with the magnetic field at one end (pole) of a magnet and the current in the second half of the coil will interact with the opposite end (pole) of the magnet such that the forces from both interactions add to one another throughout the entire range of motion causing the coil and in turn the shutter blades 24A and 24B, to move in their desired directions to expose an aperture 30 to light. Instead of a counterwound coil two separate coils, wound in the same direction, can be used if connected to each other electrically such that current flows through each of the coils in an opposing direction.

The operation of the shutter 10 is as follows: In an inactivated state, the springs 20 hold the bobbins 18 against stops 26 (see FIG. 2A) in the frame 12 and the shutter blades 24A and 24B are at rest and overlap one another so as to prevent light from passing through the aperture 30. To activate the shutter 10 current is caused to flow through the springs 20 and through the coils 22 which are connected in series. Although not shown, it is well known that shutters are normally positioned within cameras and that the picture taking button is normally used to cause current to flow from a battery to the shutter mechanism. Once energized, each coil 22 experiences a Lorentz force due to the magnetic field of the axially polarized magnets 16 in the bearing rods 14. This force causes the bobbins 18 to move along the bearing rods 14 in such a way that the shutter blades 24A and 24B move in opposite directions relative to one another thereby uncovering the aperture 30 allowing light to expose an image recording media such as film or an electronic sensor array.

Referring to FIG. 2A wherein an enlarged view of one spring 20 and bobbin 18 portion of the shutter 10 is shown for ease of understanding. The coil 22 is shown wound around the bobbin 18 with direction arrows added to indicate the direction of the coil wind and the direction of current flow through the coil 22. Note that the direction of the coil wind changes at approximately the midpoint of the coil 22 forming counter wound sections 22A and 22B. Note the dashed lines in FIG. 2A as they outline the position of the axially polarized magnet 16. The magnet 16 is shown more clearly in FIG. 2B separated from its associated bearing rod 14.

Figure 3:
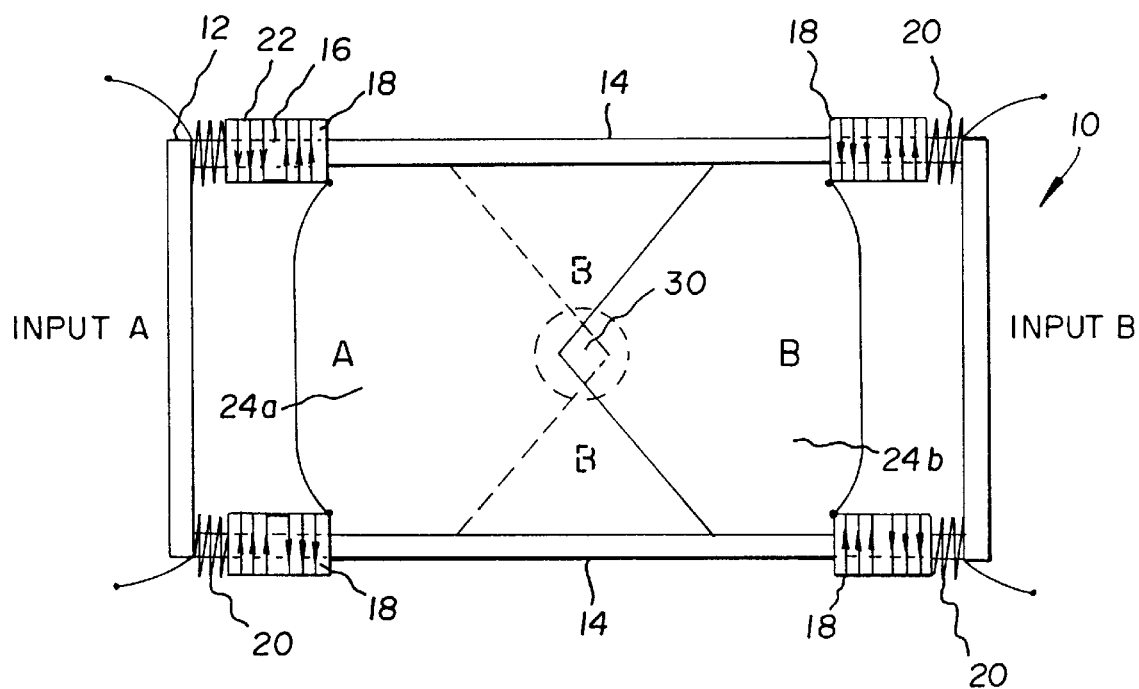
FIG. 3 illustrates the shutter of the present invention in its open state.

FIG. 3 illustrates the positioning of the shutter blades 24A and 24B in the open position exposing the aperture 30. Both the magnitude of the separation of the blades and the duration of an exposure can be set by controlling the magnitude and the duration of the current flow through the coils 22. Once the current is turned off, the blades 24A and 24B return to their inactivated state due to the force exerted by the springs 20.

FIG. 4A illustrates the shutter driving circuitry which is comprised of drive sources A and B, each connected in series to a pair of counter wound coils 22. In practice, a current pulse, illustrated in FIG. 4B is applied to the coils 22 to in turn cause the shutter blades to move along the rails to the open position. As indicated with dotted lines the amplitude and the duration of the current pulse is selected to cause the desired aperture opening and shutter speed, respectively. Other variations of the current waveform may be selected to achieve a desired exposure profile.

The invention has been described with reference to a preferred embodiment. However, it will be appreciated that variations and modifications can be effected by a person of ordinary skill in the art without departing from the scope of the invention.

PARTS LIST 10 camera shutter
12 frame
14 rods
16 magnets
18 bobbins
20 springs
22 electrical coil
22A and 22B counterwound coil sections
24A shutter blade
24B shutter blade
26 stops
30 aperture

We claim:

1. A shutter comprising:
   a shutter blade frame comprised of two spaced apart rails, each rail incorporating at least one magnet section;
   at least one pair of electromagnet means positioned for movement along said rails;
   at least one shutter blade having an opening defined thereby and connected between the at least one pair of electromagnet means for movement along said rails from a rest position to an open position so as to cause an alignment of the shutter blade's defined opening with a selected light path when current is applied to said electromagnet means; and
   spring means positioned on said shutter blade frame for urging the at least one shutter blade to a rest position.

2. The shutter according to claim 1 and further comprising; a pair of shutter blades each connected to an associated pair of electromagnet means for counter movement along said rails between a closed position and an open position so as to cause an alignment of each shutter blade's defined opening with the selected light path when current is applied to the pairs of electromagnet means.

3. The shutter according to claim 1 wherein each electromagnet means is formed as counterwound coils.

4. The shutter according to claim 1 wherein each electromagnet means is comprised of two wound coils connected to effectively form counterwound coils.

5. The shutter according to claim 1 and further comprising; at least one bobbin slidably restrained on each of said rails with the electromagnet means formed thereon.

* * * * *